J. A. LONG.
HAME FASTENING.
APPLICATION FILED AUG. 25, 1908.
921,616.  Patented May 11, 1909.
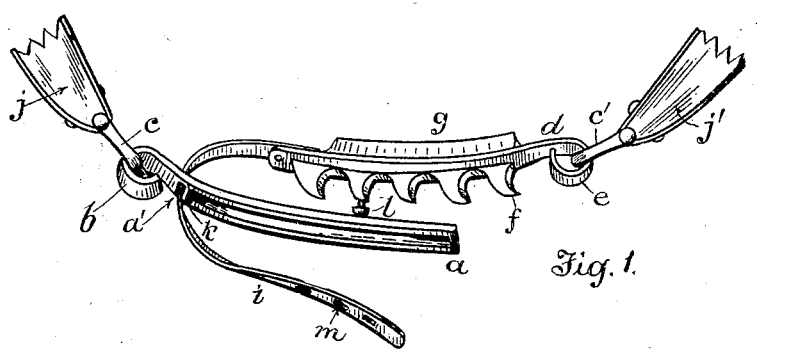
Fig. 1.
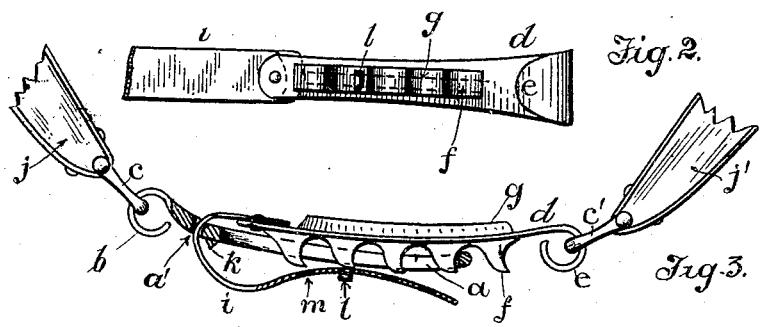
Fig. 2.
Fig. 3.
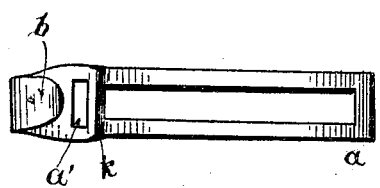
Fig. 4.
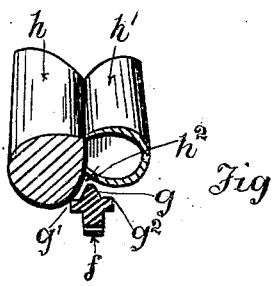
Fig. 5.
Witnesses:
Alpha A. Turner.
R. V. Meikle.
Inventor,
John Albert Long
by T. J. Geisler
Atty.

UNITED STATES PATENT OFFICE.

JOHN ALBERT LONG, OF ROSEBURG, OREGON.

HAME-FASTENING.

No. 921,616.      Specification of Letters Patent.      Patented May 11, 1909.

Application filed August 25, 1908. Serial No. 450,249.

*To all whom it may concern:*

Be it known that I, JOHN ALBERT LONG, a citizen of the United States, and resident of Roseburg, in the county of Douglas, State of Oregon, have invented a new and useful Improvement in Hame-Fastenings, of which the following is a specification, reference being had to the accompanying drawings as constituting a part thereof.

My invention has for its object to provide a simply constructed but efficient fastening for securing the lower ends of the hames on the rim of the collar.

It is furthermore my object to so arrange my fastening that the same may be quickly cinched up, and as readily unloosened again, and also to provide against the accidental coming apart of my hame-fastening.

In the drawings, Figure 1 shows a perspective of my hame-fastening, the two members thereof being separated or disengaged, so as to more clearly illustrate the mode of operation for fastening or removing the hames. Fig. 2 is a bottom view of the toothed members of my hame-fastening; Fig. 3 shows the two members of my hame-fastening interlocked as in practice, the devices being partly drawn in section to more clearly show the correlation of the parts; Fig. 4 is a bottom view of the loop member; and Fig. 5 is a cross-section centrally taken through the lower or throat part of the collar, and illustrates the manner in which an integral longitudinal rib on the hook member is seated in the crease commonly formed at the rim of a collar, and by which arrangement my hame-fastening is secured against accidental displacement.

The letters designate the parts referred to.

My hame-fastening consists of two members $a, d$. One thereof is a loop $a$, and is provided with a hook $b$, by which it is fastened to the ring $c$, commonly found at the bottom end of the hame member $j$; after the loop member $a$ is fastened to the ring $c$ the hook $b$ is tapped down, so that the parts cannot become disengaged. The opposite member $d$, of my hame fastening is also made with a hook $e$, by which it is attached to a ring $c'$ on the lower end of the opposite hame-member $j'$, the hook $e$ being tapped down to prevent disengagement. On the underside of the member $d$, viewing the same as shown in Fig. 1, is provided a series of teeth $f$, and on the upper side thereof is provided a longitudinal lug or rib $g$, centrally arranged as shown in Figs. 2 and 5, so as to leave lateral shoulders $g', g^2$.

The function of the rib $g$ is to securely hold the hame-fastening in the crease $h^2$ at the rim of the collar, and prevent the fastening being forced out of place by the action of the horse rubbing against a post, or otherwise.

In practice the rib $g$ of the member $d$ will be seated, as illustrated in Fig. 5, in the longitudinal recess or crease $h^2$ which occurs at the juncture of the roll $h'$ with the main body of the collar; thus when once my hame-fastening is drawn tight, it is impossible for it to become accidentally displaced.

When to be interlocked, the members $a, d$, are brought together, by the aid of a cinch strap $i$, which is riveted to the member $d$ and is passed through a slot $a'$ provided therefor in the member $a$. Both of the members $a, d$, are made of curved shape so as to fit the bottom of the collar.

To draw the two members of the hame-fastening together the strap is in the first place inserted through the slot $a'$ of the member $a$, and by then taking hold of the end of said strap, the members $a, d$, may be drawn together to the required degree of tightness; thereupon the loop $a$ may be engaged with the nearest of the teeth $f$ of the member $d$. The strap $i$ is then released, and the reflex or spreading tension of the hame-members $j j'$ will so securely interlock the two members of the fastening that they cannot be disengaged, except by again forcibly drawing the parts together by the cinch strap, as in the first instance. On the other hand the unloosening of my hame-fastening is obviously a simple operation; for as soon as the parts $a, d$, are drawn together by a pull on the strap $i$, the loop $a$ will be disengaged from the toothed member, and stand outward clear thereof. The margin of the upper end of the loop $a$ is preferably reinforced by a rib $k$.

On one of the teeth $f$, preferably the middle one of the series is provided a rigid button $l$, the head of which is arranged transversely to the body of the member, $d$, and the strap $i$ is made with a series of elongated eyes $m$. After the two members of my fastening have been interlocked to fasten the hames on the collar, the end of the cinch-strap $i$ is fastened on the button $l$ by turning the strap-end crosswise, and then pushing the button through the nearest of the eyes $m$. When so arranged the strap end will operate to hold the loop member $a$ against being accidentally disengaged from member $d$, under any circumstances; and besides the strap-end itself will be held up out of the way.

I claim:

1. A hame-fastening comprising two curved members adapted to be secured at their outer ends to the lower ends of hames, one of said members consisting of a bar provided on its under face with a series of longitudinally alined curved teeth, a longitudinally arranged rib on the upper face of said bar adapted to be seated in the crease at the rim of a collar, a cinch strap secured to said bar, and the other member being an elongated loop adapted to be engaged with one of the teeth of said bar, a button on one of said teeth and said cinch strap being perforated so as to be adapted to be secured on said button and thereby prevent the loop member from becoming disengaged.

2. A hame-fastening, comprising in combination with the hames two curved members fastened at their outer ends to the lower ends of the hames, one of said members consisting of a bar provided on its under face with a series of longitudinally alined curved teeth, a longitudinally arranged rib on the upper face of said bar, and having lateral shoulders $g'$, $g^2$, for the purpose specified, a cinch strap secured to said bar, and the other member being an elongated loop adapted to be engaged with one of the teeth of said bar, a button on one of said teeth, and said cinch strap being perforated so as to be adapted to be secured on said button and thereby prevent the loop member from becoming disengaged.

3. A hame-fastening comprising in combination with the hames two curved members fastened at their outer ends to the lower ends of the hames, one of said members consisting of a bar provided on its under face with a series of longitudinally alined curved teeth, a longitudinally arranged rib on the upper face of said bar, and having lateral shoulders $g'$, $g^2$, for the purpose specified, a cinch strap secured to said bar, and the other member being an elongated loop adapted to be engaged with one of the teeth of said bar, said loop member being provided with a transverse slot through which to insert the cinch strap, a button on one of said teeth, and said cinch strap being perforated so as to be adapted to be secured on said button and thereby prevent the loop member from becoming disengaged.

JOHN ALBERT LONG.

Witnesses:
  HENRY H. WOODWARD,
  HENRY KADDERY.